(12) United States Patent
Shurtz et al.

(10) Patent No.: US 8,656,087 B2
(45) Date of Patent: Feb. 18, 2014

(54) PAGE MODE ACCESS BY NON-PAGE MODE DEVICE

(75) Inventors: Gregory Raymond Shurtz, Houston, TX (US); Narayanan Swaminathan, Sugarland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 578 days.

(21) Appl. No.: 13/020,681

(22) Filed: Feb. 3, 2011

(65) Prior Publication Data
US 2012/0203977 A1    Aug. 9, 2012

(51) Int. Cl.
*G06F 12/00*    (2006.01)
(52) U.S. Cl.
USPC .................... 711/103; 711/167; 711/E21.001
(58) Field of Classification Search
None
See application file for complete search history.

(56) References Cited

PUBLICATIONS

"User's Guide TMS320C6474 DSP Enhanced DMA (EDMA3) Controller", Literature No. SPRUG11A, pp. 1-178, Oct. 2008—Revised Jan. 2010, Texas Instruments Inc.
"S29GL-P MirrorBit Flash Family, S29GL01GP, S29GL512P, S29GL256P, S29GL128P 1 Gigabit, 512 Megabit, 256 Megabit and 128 Megabit .0 Volt-only Page Mode Flash Memory featuring 90 nm MirrorBit Process Technology", Data Sheet, Publication No. S29GL-P_00, Rev A, Amendment 13, pp. 1-80, Nov. 17, 2010, Spansion.

*Primary Examiner* — Kevin Verbrugge
(74) *Attorney, Agent, or Firm* — Lawrence J. Bassuk; Wade J. Brady, III; Frederick J. Telecky, Jr.

(57) ABSTRACT

A method is provided for accessing a memory device having pages by a memory interface that does not directly support page accesses. A first memory space of the memory interface is configured with a first set of timing parameters and a second memory space of the memory interface is configured with a second set of timing parameters. A page mode access is initiated to a page of the memory device using the first memory space of the memory interface for at least a first data transfer and continued using the second memory space of the memory interface for a plurality of data transfers.

12 Claims, 9 Drawing Sheets

PAGE MODE ACCESS BY NON-PAGE MODE DEVICE

FIELD OF THE INVENTION

This invention generally relates to microcontrollers and in particular to accessing a memory device using a page mode access.

BACKGROUND OF THE INVENTION

A processor device may have a generic asynchronous external memory interface (EMIF) that associates different access timing characteristics with different memory spaces or 'chip selects'. It is also common in processor devices to have a DMA (dedicated memory access) controller which has access to those memory spaces or 'chip selects'. A common type of flash memory in the industry is the "page mode" flash memory which requires a certain set of access timing characteristics for the first access of a "page" or block of flash memory locations, but then allows a different (much faster) set of access timing characteristics for access to the remaining data in the page. If a processor device does not have an EMIF that specifically implements direct support of page mode for flash memory, then some performance may be lost when accessing such a flash memory because the slower access timing characteristics of the first access is used for all accesses to the page.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
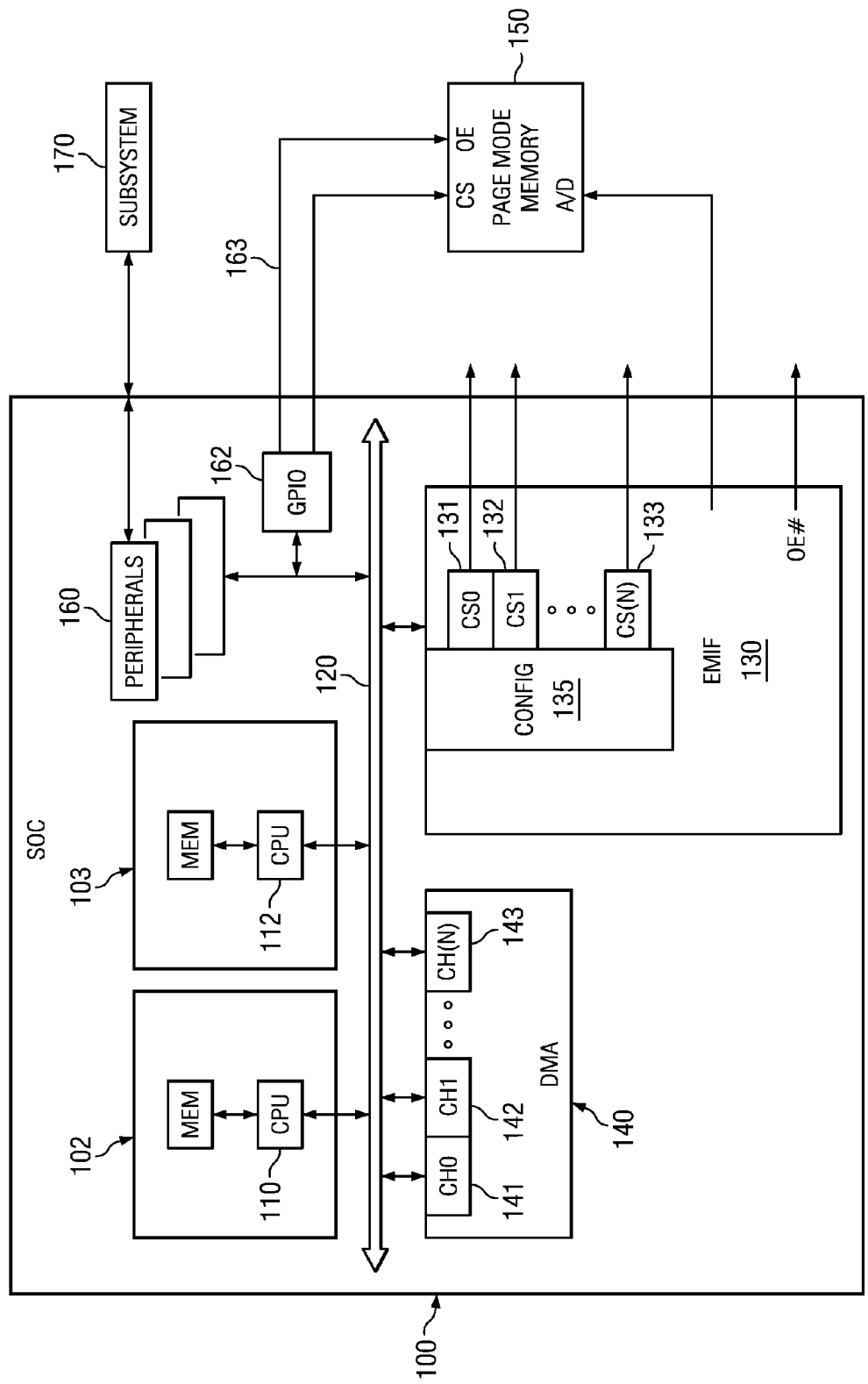
FIG. 1 is a block diagram illustrating an exemplary non-page mode system on a chip (SOC) coupled to a page mode memory device with no additional logic.

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Flash memory now provides low cost non-volatile storage and is used in many systems or devices to hold software that is loaded into volatile memory when the system or device is turned on. It can also be used to hold large amount of data, such as audio or video data, that may be accessed to produce audio or video for a user interface. Embodiments of the invention allow very efficient access to page mode flash, even when a processor device has no native support of page mode access timings. Otherwise, when using a processor device that does not support page mode access to read large blocks of code/data from such flash, overall load time for the processor may be long because the processor device is forced to use slower single word accesses.

Various embodiments of the invention will be described in detail below. In the various embodiments, either no additional logic or very minimal logic is required in addition to existing external memory interface control logic. Therefore, a system may gain a performance benefit using existing devices that do not support page mode access without the expense of producing a new ASIC (application specific integrated circuit) design or using a specific device that supports page mode access.

For example, the NOR page mode read of the Spansion S29GL-P MirrorBit® Flash Family is 110 ns for single access and 25 ns for page mode accesses. The page size is eight words or 16 bytes. The time it takes to read an entire page of 16 bytes using single access would be 110×8=880 ns for single access. It would be 110+25×7=285 ns for page mode access. Therefore, accessing an eight word page in page mode may be roughly 3.1 times faster than accessing the eight words individually. When a memory access to a particular address in a page is performed, other words within the same page may be accessed by changing only the three least significant bits (lsb) of the address, since the page size is eight words. If address bits other than the three lsb are changed, then a new page access is initiated.

It is common for processor devices to have a generic asynchronous external memory interface (EMIF) which associates different access timing characteristics with different memory spaces or 'chip selects'. It is also common in processor devices to have a DMA (dedicated memory access) controller which has access to those memory spaces or 'chip selects'. For a device in which the EMIF is capable of implementing at least two different access timings for two different memory mapped spaces, and the processor and a DMA engine can access each of these two EMIF spaces, then efficient "page mode" access may be emulated to achieve faster overall average access to page mode flash in spite of the fact that its external memory interface does not directly support page mode flash accesses. Furthermore, if the DMA has chaining capability where the end of one transfer can kick-off the start of another transfer, then even more efficient accesses may be done.

In a first embodiment of the invention, one of the memory mapped spaces, also referred to as chip select spaces, of the EMIF may be configured for the slower access timings required by the first word of a page. This will be referred to as chip select space zero (CS0) for this example. Then another one of the memory mapped spaces of the EMIF may be configured for the faster access timings required by every subsequent word of the page. This will be referred to as chip select space one (CS1) for this example. The two chip select outputs associated with these memory mapped spaces may be left unconnected, and a software programmable general purpose output (GPO) data latch may be connected to the chip select input of a page mode flash device.

Before accessing the flash device, the processor device may first activate the GPO connected to the chip select input of the flash device to be active. The processor will then access the first word of a page with an appropriate address in the CS0 space using the appropriate access timings according to the CS0 configuration. The processor may then kick off a DMA transfer to access the remainder of the page starting with the second word of the page and ending at the last word of the page. The DMA will have been preconfigured to access the appropriate addresses in CS1 space which uses the faster access timings per the EMIF CS1 configuration.

In another embodiment, if the DMA supports linked list or chained transfers, then the CS0 access and the CS1 accesses may both be performed by the DMA. In this embodiment, the DMA is configured to perform a single access to CS0 for a first word of a page and then upon completion to link to another DMA access that is configured to perform n minus one transfers (n being total words in a page) to CS1 space starting at the second word of the page.

In another embodiment, the DMA is not used. In this embodiment, both the CS0 and the CS1 transfers are performed using the processor itself. This is effective if the processor itself is able to do very efficient back to back transfers to copy data from the flash to internal memory.

These embodiments also require that the GPO data latch be left asserted/active for the full duration of the page access and that the EMIF does not change the value driven on the address bus between accesses, meaning it always drives the last valid address until another access is performed. This is typical of EMIF interfaces on most processor devices. Alternatively, if no other device is accessed using the EMIF, the GPO signal may be eliminated and the page mode device's chip select may be tied active. However, using a GPO data latch allows the processor to deassert the flash chip select while accessing other devices using the same EMIF.

To make the page mode access even more efficient and avoid output enabling times, the output enable (OE) signal of flash device need not be toggled for every single access of a page mode access. This is typical of most NOR type flash devices that support page mode access. This may be accomplished by connecting another GPO pin to control the OE input of the flash device, for example. Alternately, the same GPO pin that is connected to the chip select input of the flash device may be connected to the output enable input of the flash device if only reads are performed to the flash device.

FIG. 1 is a block diagram illustrating an exemplary non-page mode system on a chip (SOC) 100 coupled to a page mode memory device with no additional logic as described above. For purposes of this disclosure, the somewhat generic term "microcontroller" (MCU) is used to apply to any complex digital system on a chip (SOC) that may include one or more processing modules 102, 103, peripherals 160 and/or DMA (direct memory access) controller 140. Each processor module 102, 103 may include a processing unit (CPU) 110, 112 and local memory (MEM). The memory may be loaded with instruction programs that are executed by CPU(s) 110, 112 to perform the system applications. Processor modules 102, 103 are coupled to system bus 120 for access to external memory via external memory interface (EMIF) 130. Peripherals 160 are also coupled to system bus 120 to allow access and control by CPU 102, 103.

The topology and configuration of SOC 100 is merely intended as an example. Other embodiments of the invention may involve various configurations of buses for interconnecting various combinations of memory modules, various combinations of peripheral modules, multiple processors, etc. In some embodiments, CPU 102, 103 may have a direct connection to the system bus, while in other embodiments the CPU may access the system bus via a path through a cache or other type of memory buffer, for example. Additional volatile and/or non-volatile memory may be coupled to bus 120 and included within SOC 100. System bus 120 may be a single bus, or multiple buses coupled via bridges, for example. System bus 120 may be a cross-bar type of complex bus, for example.

Processor module 102, 103 may include any one of the various types of microprocessors or microcontrollers that are now known or later developed. For example, CPU 110 or 112 may be a digital signal processor, a conventional processor, or a reduced instruction set processor. As used herein, the term "microprocessor" or CPU is intended to refer to any processor that may be included within a system on a chip.

Peripheral modules 160 may provide interconnection to various external subsystems 170, depending on the type of overall system in which SOC is embedded. Subsystem 170 may be a motor or other type of mechanical actuator, for example, in which case SOC 100 controls motor speed and direction by controlling the application of voltage to multiple sets of stator windings based on rotor position. In another example, subsystem 170 may be a speaker for playing audio sound or music that is converted from a digital stream by SOC 100. Subsystem may be a video display that displays images or video that is processed by SOC 100. For the purpose of the description herein, subsystem 170 is any type of device or component now known or later developed that requires some form of interaction with SOC 100.

EMIF 130 is capable of implementing at least two different access timings for two different memory mapped spaces and the processors and DMA engine 140 can access each of these EMIF memory spaces. In this example, chip select space zero (CS0) 131, chip select space one (CS1) 132, and additional chip select spaces n (CS(n)) 133 are included within EMIF 130. Each chip select space is configured by loading appropriate timing parameters into configuration registers 135. In some embodiments, the configuration may be done under control of one of the processors when the system is first started. Configuration information may be stored in a non-volatile memory located within SOC 100, for example. In other embodiments, configuration registers 135 may be non-volatile storage that is initialized during the manufacturing process of SOC 100. In yet other embodiments, CS0 and/or CS1 may have initial default timing configurations that are later changed by one of the processors using configuration information that is stored within SOC 100 or obtained by accessing non-volatile memory device 150, for example.

EMIF 130 does not change the value driven on the address bus between accesses, meaning it always drives the last valid address until another access is performed. This allows page accesses to be performed. After an initial memory access to a particular address in a page of memory device 150 is performed, other words within the same page may be accessed by changing only the least significant bits (lsb) of the address. For memory device 150, the page size is eight words, therefore the three lsb of the address control access to words within a page of memory device 150. If address bits other than the three lsb are changed, then a new page access is initiated.

DMA engine 140 has several channels, as illustrated by channel zero (CH0) 141, channel one (CH1) 142 and channel "n" (CH(N)) 143. Each channel includes configuration registers that are loaded by one of the processors 102,103 to specify a start address of the source, a start address of the destination, length of transfer, and any other information needed by the channel to perform a data transfer. The channels may also be chained, such that when one channel completes a transfer it will send a signal to the next channel in the chain to cause the next channel to start a transfer. For example, CH0 141 may be chained to CH1 142 by loading in value in a configuration register of CH0 that indicates CH0 is chained to CH1. A detailed description of a suitable multi-channel DMA engine is provided in "TMS320C6474 DSP Enhanced DMA (EDMA3) Controller User Guide", SPRUG11A, which is incorporated by reference herein.

General purpose input/output (GPIO) module 162 is representative of any of many known GPIO modules that may be used as a data latch for input and/or output data. In some embodiments, module 162 may be a general purpose output (GPO) data latch module. Processor 102, 103 may write a data value to GPIO 162 that is stored within GPIO 162. Output signals are then produced that mirror the data value. In this example, one output signal is connected to a chip select (CS) input of page mode flash memory device 150. Another output signal is connected to the output enable (OE) of memory device 150. Address and data buses (A/D) of memory device are coupled to system bus 120 via buffers within EMIF 130. Timing of address, data and control signals is controlled by EMIF 130 according to the timing configuration for the currently active memory space.

Note that the chip select outputs from EMIF 130 are not connected to memory device 150. Thus, a first memory space of the EMIF may be configured with a first set of timing parameters and a second memory space of the EMIF may be configured with a second set of timing parameters. A page mode access may be initiated by a processor to a page of memory device 150 using the first memory space of the EMIF for at least a first data transfer by first writing a data value to GPIO to assert the chip select and output enable of memory device 150. The processor may then continue the page mode access using the second memory space of the EMIF for a plurality of data transfers.

Alternatively, DMA 140 may be programmed to complete a page mode access that was started by the processor by programming a DMA channel to access the memory device using the second memory space of the EMIF. Similarly, DMA 140 may be programmed to access a first word in a page of memory device 150 using a first channel of the EMIF and then chain to a second DMA channel to complete a page mode access that was started by the first DMA channel by programming the second DMA channel to access the memory device using the second memory space of the EMIF.

In summary, the embodiments described above emulate page mode accesses by triggering a slower initial access followed by multiple faster page accesses. The EMIF design holds the MSB (most significant bits) address bits so they do not change between the two CS accesses as long as the accessed address is the same. For example, when accessing the addresses 0x2000_0000 mapped to (CS0) and 0x2400_0000 mapped to (CS1), the address bits will not toggle—only the appropriate CSx signal will be asserted/deasserted.

In any of the embodiments described above, a device such as SOC 100 that does not have native support for a page mode memory device may be configured to emulate a page mode access using faster access timing parameters without any additional logic gates.

Figure 2:
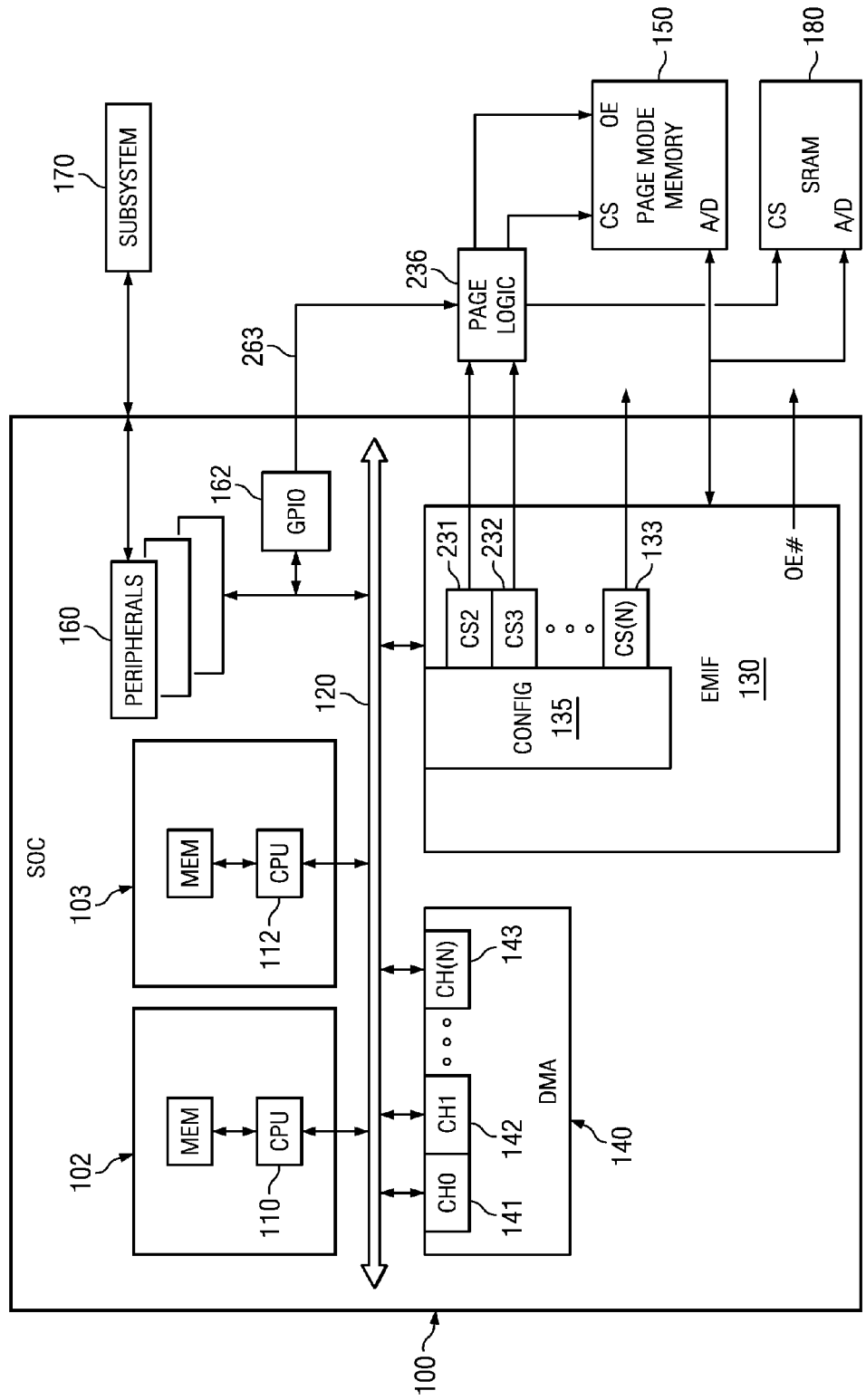
FIG. 2 is a block diagram illustrating an exemplary non-page mode SOC coupled to a page mode memory device via page mode glue logic.

FIG. 2 is a block diagram illustrating an exemplary SOC 100 that does not have native page mode support coupled to page mode memory device 150 via page mode glue logic 236. In this example, additional external memory in the form of static random access memory (SRAM) 180 may be coupled to SOC 100. The operation of page mode glue logic 236 will be described in more detail below. In this example, memory mapped space for chip select two (CS2) 231 and memory mapped space for chip select three (CS3) 232 are used to access flash memory device 150. In other embodiments, different memory mapped spaces may be used. A GPIO signal 263 is connected to glue logic 236.

Figure 3:
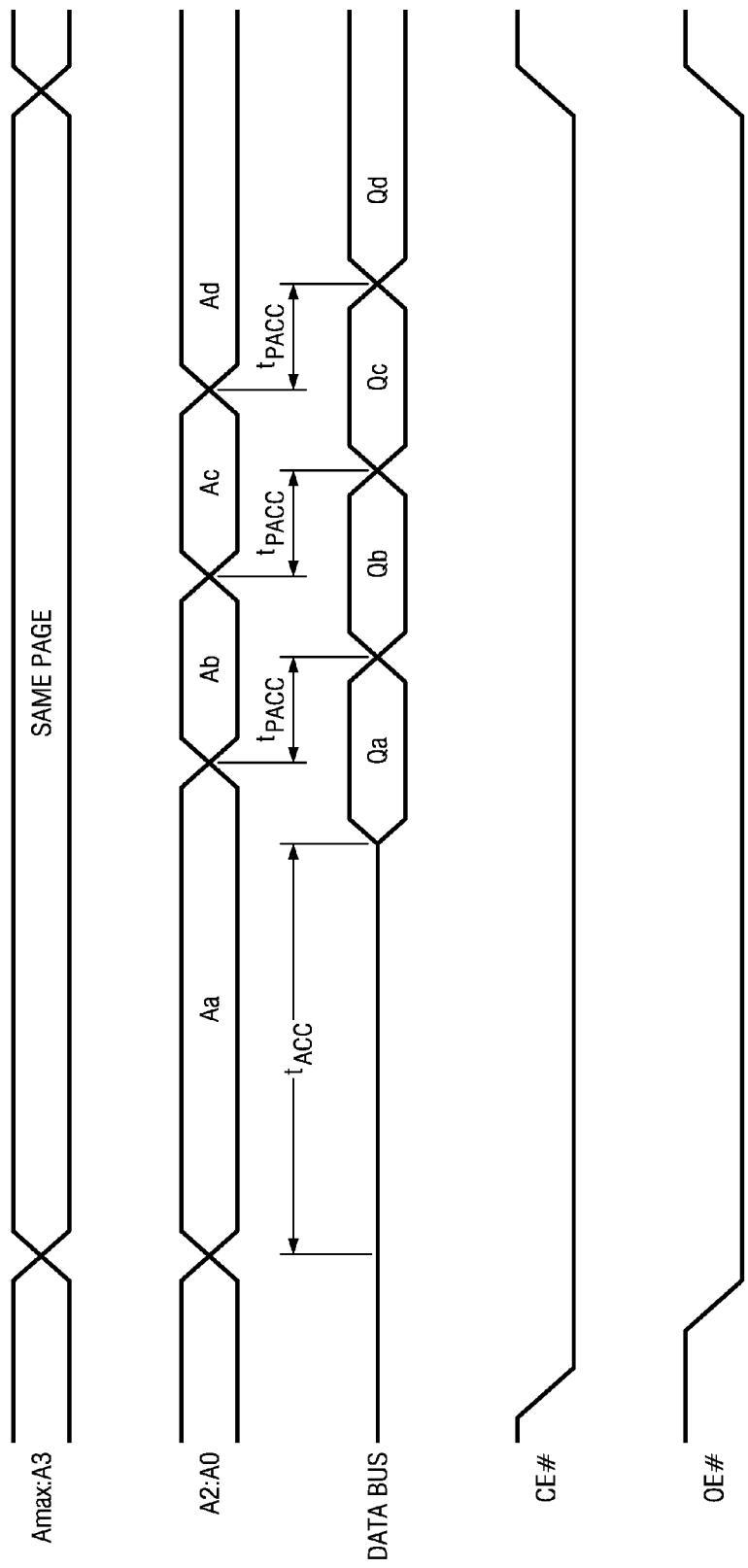
FIG. 3 is timing diagram illustrating a page mode access.

FIG. 3 is timing diagram illustrating a page mode access for flash memory device 150, such as a Spansion S29GL-P MirrorBit® Flash device. Another signal of interest apart from CS# (chip select) is OE# (output enable) which is normally driven by the EMIF. As shown in FIG. 3 from the NOR flash specification, there should be no assertion and deassertion of OE# during a page access. This helps in getting the maximum performance out of the NOR flash. However, EMIF 130 asserts and deasserts the OE# signal based on the programmed configuration registers 135 (r_setup, r_strobe and r_hold) for every memory access, irrespective of whether it is a page access or not. When the OE# signal is asserted/deasserted, the time it takes to get valid data from NOR flash 150 will be the greater of the page access time (25 ns from address) and the output enable to output delay (25 ns from OE#). As OE# is asserted one clock cycle after the address by the EMIF (based on the r_setup parameter in the emif_acsr register), the output data will be available almost one clock cycle after the page access time. Therefore it makes sense to have the OE# signal of flash memory 150 controlled by GPIO signal 163, as illustrated in FIG. 1. However, this is an optional recommendation to improve performance with the dual chip select approach.

Figure 4:
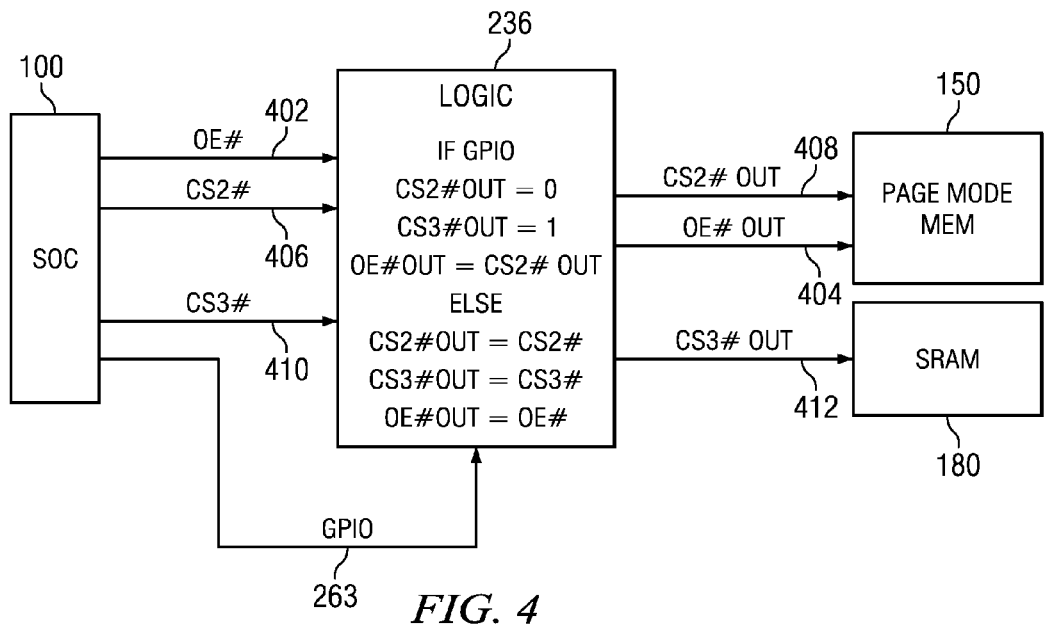
FIGS. 4 and 5 illustrate details of the page mode logic used with the SOC of FIG. 2.
Figure 5:
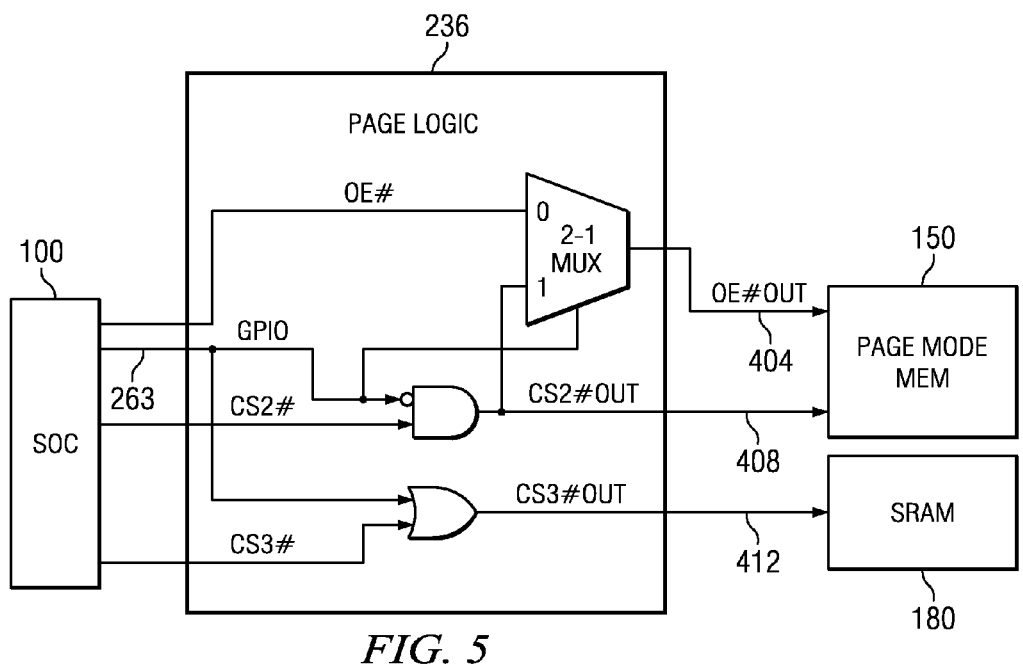

Note that the dual chip select approach of FIG. 1 relies on tying the OE# low using GPIO 162 during the page access (single or multiple pages). During this time no other master should access the EMIF and any of its chip selects, as this may lead to indeterminate results. This approach is therefore suitable for block copy of data during boot time, when there are no other accesses to the EMIF happening in the system FIGS. 4 and 5 illustrate details of page mode logic 236 used with SOC 100 in FIG. 2. In this example, GPIO signal 263 from SOC 100 is coupled to glue logic 236. Glue logic 236 ensures two things: 1) CS2#408 for NOR flash 150 remains asserted during an entire page mode access, that is, during both CS2 and CS3 accesses; 2) CS3#412 will be deasserted during page mode access even though CS3#410 is asserted during page mode accesses, so that other devices such as SRAM 180 connected to CS3#412 will not respond during a page mode access to memory device 150. For other embodiments in which there are no devices connected to CS3#, there is no need to condition CS#3 with GPIO signal 263.

FIG. 4 illustrates the logic produced by glue logic 236. If GPIO signal 263 is set true by a processor within SOC 100 to initiate a page mode access, then OE#404 is tied to CS2#408; otherwise OE# signal 404 is the same as OE# signal 402 from the EMIF within SOC 100. CS2#408 remains asserted and CS3#410 remains deasserted while GPIO signal 263 is true. CS2#406 is connected to CS2 #408 and CS3#410 is connected to CS3#412 when GPIO signal 263 is false.

FIG. 5 illustrates a schematic of an example implementation of glue logic 236 that is controlled by GPIO signal 263.

Figure 6:
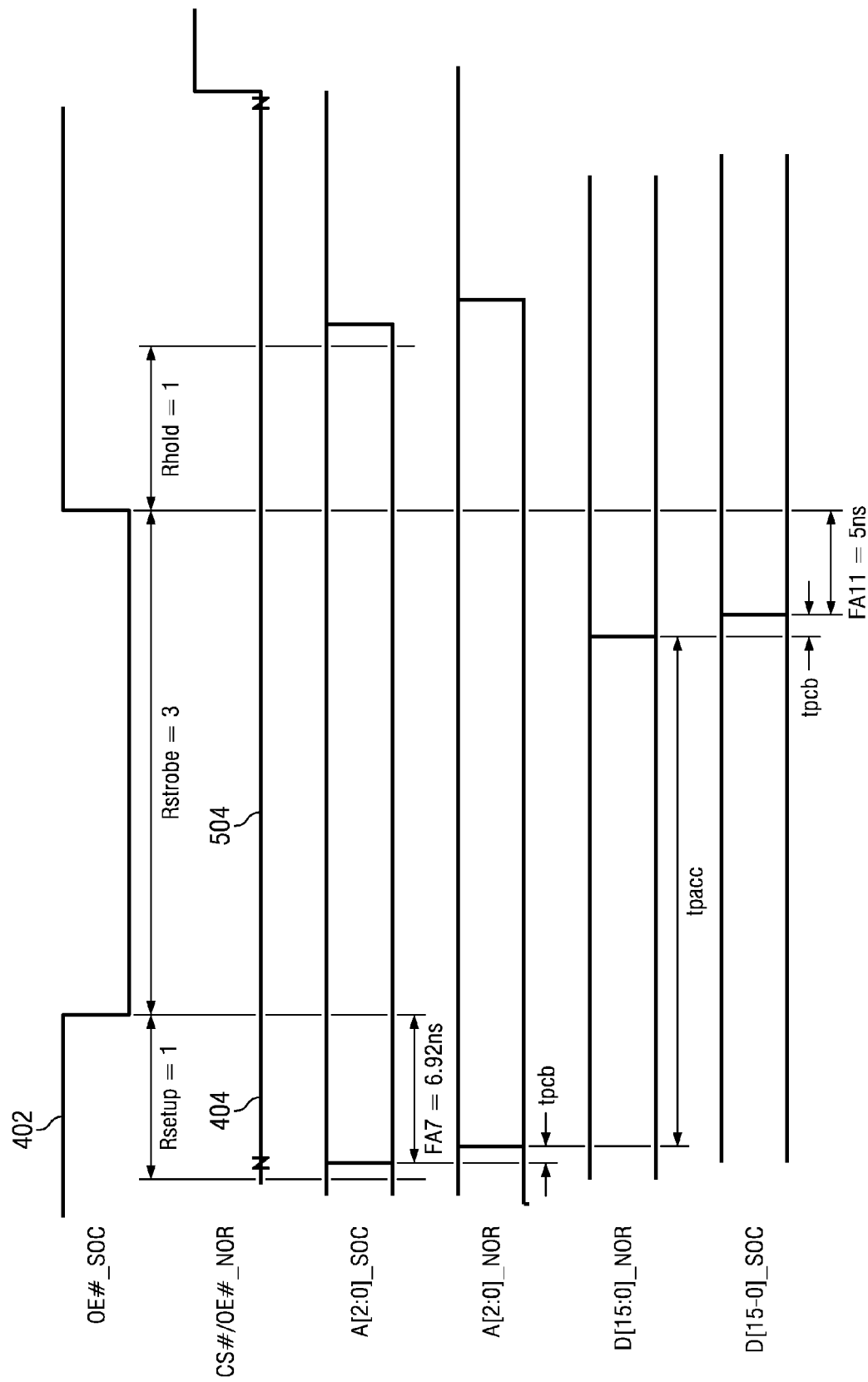
FIG. 6 is a timing diagram illustrating parameters used to configure operation of an external memory interface for page mode access.

FIG. 6 is a timing diagram illustrating parameters used to configure operation of external memory interface 130. Each memory mapped space supported by EMIF 130 may be configured by writing configuration data into configuration registers 135. In this embodiment, the following parameters are of interest for page mode emulation: strobe setup time (Rsetup), strobe time (Rstrobe), and strobe hold time (Rhold). These three parameters define strobe timing, in number of clock cycles. For example, if the EMIF clock is configured at 112 MHz, the clock period is 8.92 ns. Therefore, if Rsetup, Rstrobe and Rhold are configured to be 1, 3, 1, then an output enable strobe 402 will be asserted one clock period (8.92 ns) after the address bus (A(2-0)_SOC) bits change, will be held asserted for three clock periods (26.79 ns), and then the address bus will be changed one clock period later, as illustrated in FIG. 6.

As discussed above, in order to emulate a page mode access, one address space of the EMIF is configured with a first set of timing parameters to support the first access to a page and another address space is configured with a second set of timing parameters to support faster accesses for the rest of the page. Determination of EMIF timing parameters and read cycle time needs to comprehend the various constraints of the SOC, memory device, and interconnect delay.

To determine the parameters Rsetup, Rstrobe and Rhold, certain other timing parameters need to be considered. In FIG. 1, the parameters FA7 (address setup) and FA11 (data setup) are 6.92 ns and 5.0 ns, respectively, for SOC 100. Of course, these times will vary for other embodiments based on a particular SOC. Rsetup and Rhold should be set to as low a value as possible for the second set of parameters since strobe OE# is never toggled during a page mode access from the perspective of the NOR flash device 150. Therefore, in the second set of timing parameters, Rsetup and Rhold may be set to zero in this embodiment.

Rstrobe timing should be set such that the equation (1) is satisfied and adequate PCB (printed circuit board) margin is available.

$$Tpcb(\text{address}) + Tpacc + Tpcb(\text{data}) <= FA7 + Rstrobe - FA11 \quad (1)$$

where:

Tpcb is propagation delay of the address signals from SOC 100 to memory device 150

Tpcb is propagation delay of the data signals from memory device 150 to SOC 100

Tpacc is the access time from new address for memory device 150

In the following example, the EMIF clock is configured at 112 MHz, which implies a period of 8.92 ns. Substituting FA7=6.92 ns, FA11=5 ns and the page access time for the NOR flash (25 ns) and assigning Rstrobe=3, gives a PCB margin of 3.68 ns.

If Rstrobe=2, this gives a PCB margin of −5.24 ns which is not acceptable. Even reducing the EMIF clock frequency to 108 MHz does not help in getting a positive PCB margin.

By manipulating the value of clock period and number of strobe cycles, sufficient PCB margin may be achieved. For example, setting the EMIF clock frequency to 120 MHz and the strobe to three produces a PCB margin of around 1.32 ns which is adequate for the embodiment of FIGS. 1 and 2.

If OE# is not tied to CS# in a particular embodiment, equation (2) needs to be satisfied by the selected Rstrobe value in addition to (1).

$$Tpcb(oe\#) + Toe\# + Tpcb(\text{data}) <= Rstrobe - FA11 \quad (2)$$

where:

Toe# is the access time from the OE strobe for memory device 150

For example, if flash device 150 is a Spansion S29GL-P MirrorBit® Flash, equation (2) becomes the restricting condition, because any value of strobe which satisfies equation (2) will automatically satisfy equation (1).

In this example, setting Rstrobe to four and using the value of Toe#=25 ns, a PCB margin of 5.68 ns is produced when the EMIF is run at 112 MHz. When the EMIF is run at 120 MHz, the same strobe setting gives a PCB margin of 3.32 ns, which is adequate for this embodiment.

EMIF 130 is programmed for the two chip selects that will be used to emulate page mode accesses as illustrated in Tables 1 and 2. All timing calculations are done with an EMIF clock of 112 MHz for this example. Table 1 illustrates a set of timing parameters that may be used to configure a first memory space in EMIF 130, such as chip select 2. Table 2 illustrates a set of timing parameters that may be used to configure a second memory space in EMIF 130, such as chip select 3.

TABLE 1

Timing parameters for a first access of a page mode access

Read Setup = 0 = 1 clock cycles = 8.92 ns
Read Strobe = 12 clock cycles = 107 ns
Read Hold = 0 = 1 clock cycles = 8.92 ns

TABLE 2

Timing parameters for remaining page mode accesses

Read Setup = 0 = 1 clock cycle = 8.92 ns
Read Strobe = 3 clock cycles = 26.76 ns
Read Hold = 0 = 1 clock cycle = 8.92 ns In the embodiment of FIG. 2, DMA is the fastest way to perform page mode read accesses to flash device 150, as CPU 102 or 103 does not need to get involved. DMA also has the capability to do non-blocking accesses to the EMIF. This reduces flash device 150 access turnaround time between accesses. Table 3 illustrates an example setup for two DMA channels using two sets of parameters, Param 1 and Param 2, within DMA device 140 for reducing the turnaround times.

TABLE 3

DMA Register Setup

Param 1

ACNT = 0x2
BCNT = 0xffff
CCNT = 0x1
LINK Address = 0xffff
BIDX = 0x10
CIDX = 0
SRC = CS2_ADDR
DST = RD_VAL1

Param2

ACNT = 0xE
BCNT = 0xffff
CCNT = 0x1
LINK Address = 0xffff
BIDX = 0x10
CIDX = 0
SRC = CS3_ADDR + 2
DST = RD_VAL1 + 2

Where:
ACNT is a first dimension of an array to be transferred, of size ACNT bytes
BCNT is a second dimension, defines BCNT arrays of ACNT bytes
CCNT is a third dimension, defines CCNT frames of BCNT arrays of ACNT bytes to be transferred
BIDX is a separation between arrays
CIDX is a separation between frames
SRC = source address
DST = destination address These two parameter entries are chained together with intermediate chaining and early completion for parameter 1 and parameter 2. Chaining of the two parameter entries happens by setting the TCC (transfer complete code) of Param1 to point to Param2 and TCC pointer of Param2 to point to Param1. Early completion enables the transfer request of Param2 to be issued without waiting for PARAM1 request to complete. Also, only one ACNT transfer is completed per chain trigger event. This makes both BCNT*CCNT pages of transfer possible in such a fashion. In the example in Table 3, BCNT is set to 0xffff and CCNT is set to 1, but they can be set to a different required number of transfers in other examples.

Figure 7:
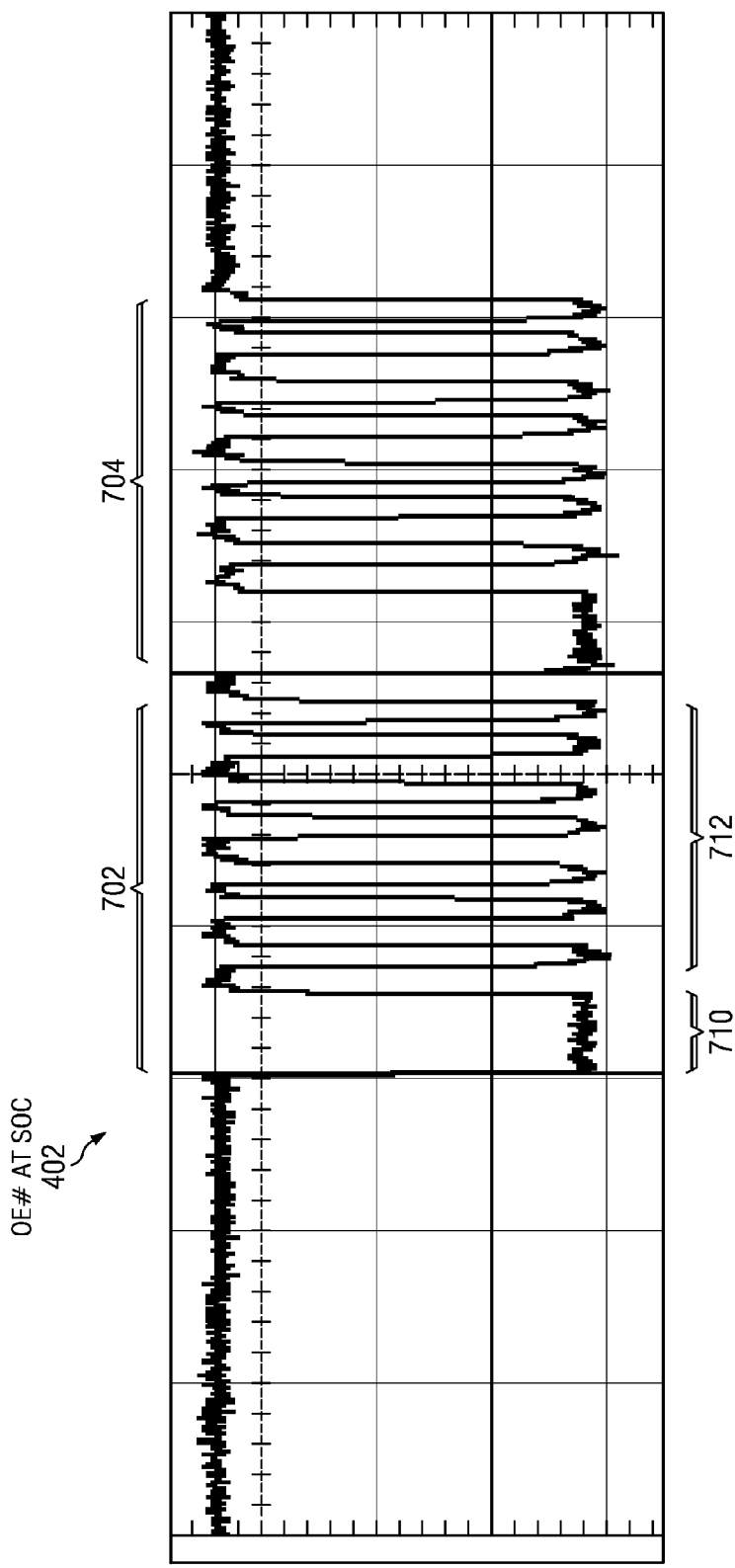
FIG. 7 is a timing diagram illustrating operation of an emulated page mode access.

FIG. 7 is a timing diagram illustrating operation of an emulated page mode access, as described above, for the embodiment of FIG. 2. OE# signal 402 is output by SOC 100, but is not connected to memory device 150 as was described above. Transfer 702 includes a slow strobe 710 for a first access to a page, followed by seven faster strobes 712 to access the remainder of the eight word page. Transfer 704 is a second back to back emulated page access.

In the embodiment of FIG. 2, a theoretical time required for a page access (16 bits) using the non-page mode approach is 880 ns. The actual time required using this non-page mode approach is 1035.6 ns which is more than theoretical because of turnaround times and rounding to whole clock cycles.

In the embodiment of FIG. 2, a theoretical time required for a page access of device 150 is 285 ns, which is 880/285~3.1× faster than a theoretical non-page access of a full page. As shown in FIG. 7, an actual time for an emulated page access using the dual chip select page mode approach described above is 524 ns. Thus, a speed up between using the dual chip select page mode and non-page mode approach for SOC 100 is approximately 1035.6/524~2×. The "dual CS" approach achieves almost 65% of the total speedup theoretically possible (3.1×) with page mode accesses. The difference is attributed to EMIF introduced turnaround times and SOC 100 required setup times apart from budgeting for PCB margin.

Figure 8:
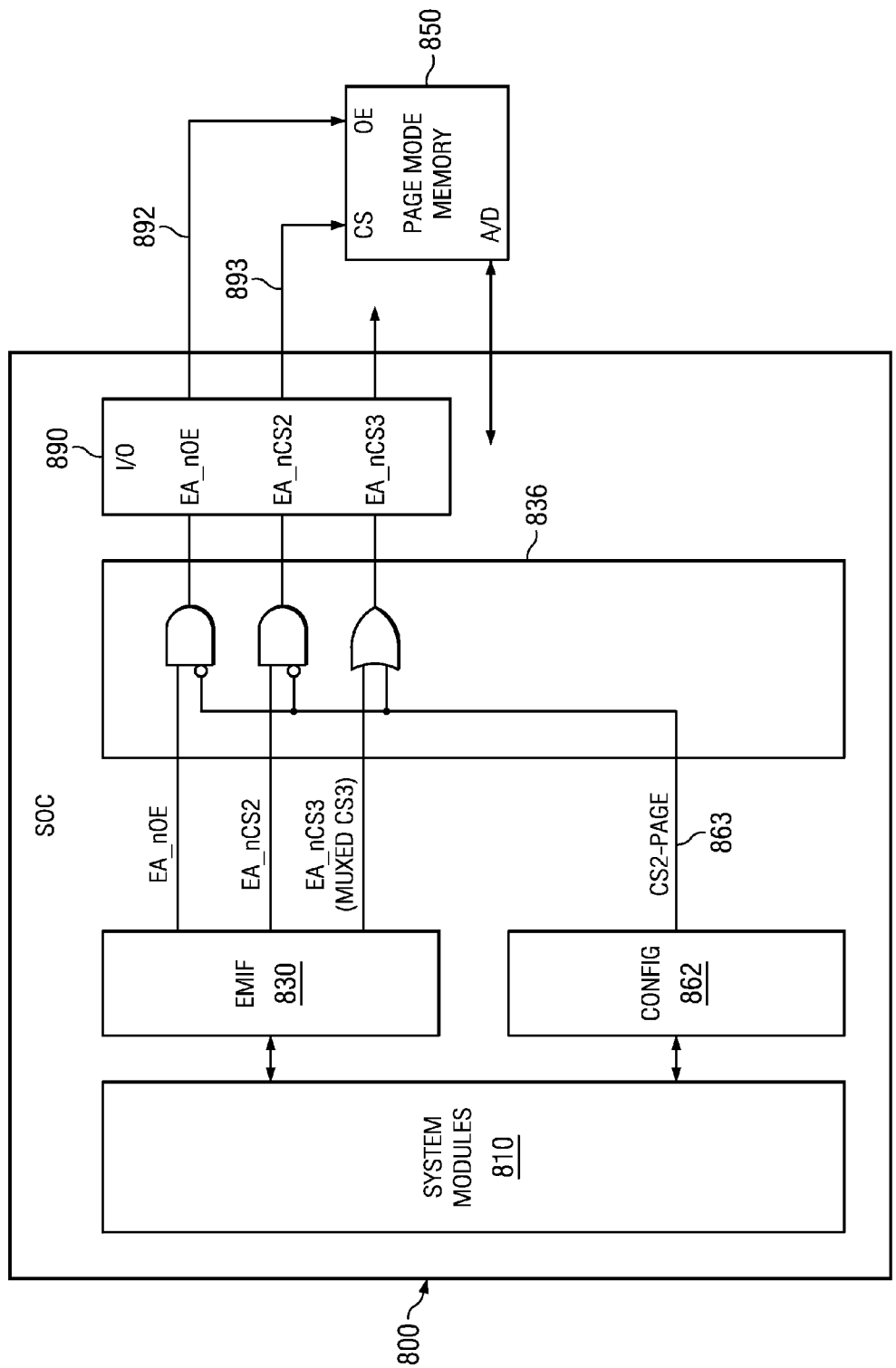
FIGS. 8 and 9 are schematics of alternate embodiments of page mode logic.
Figure 9:
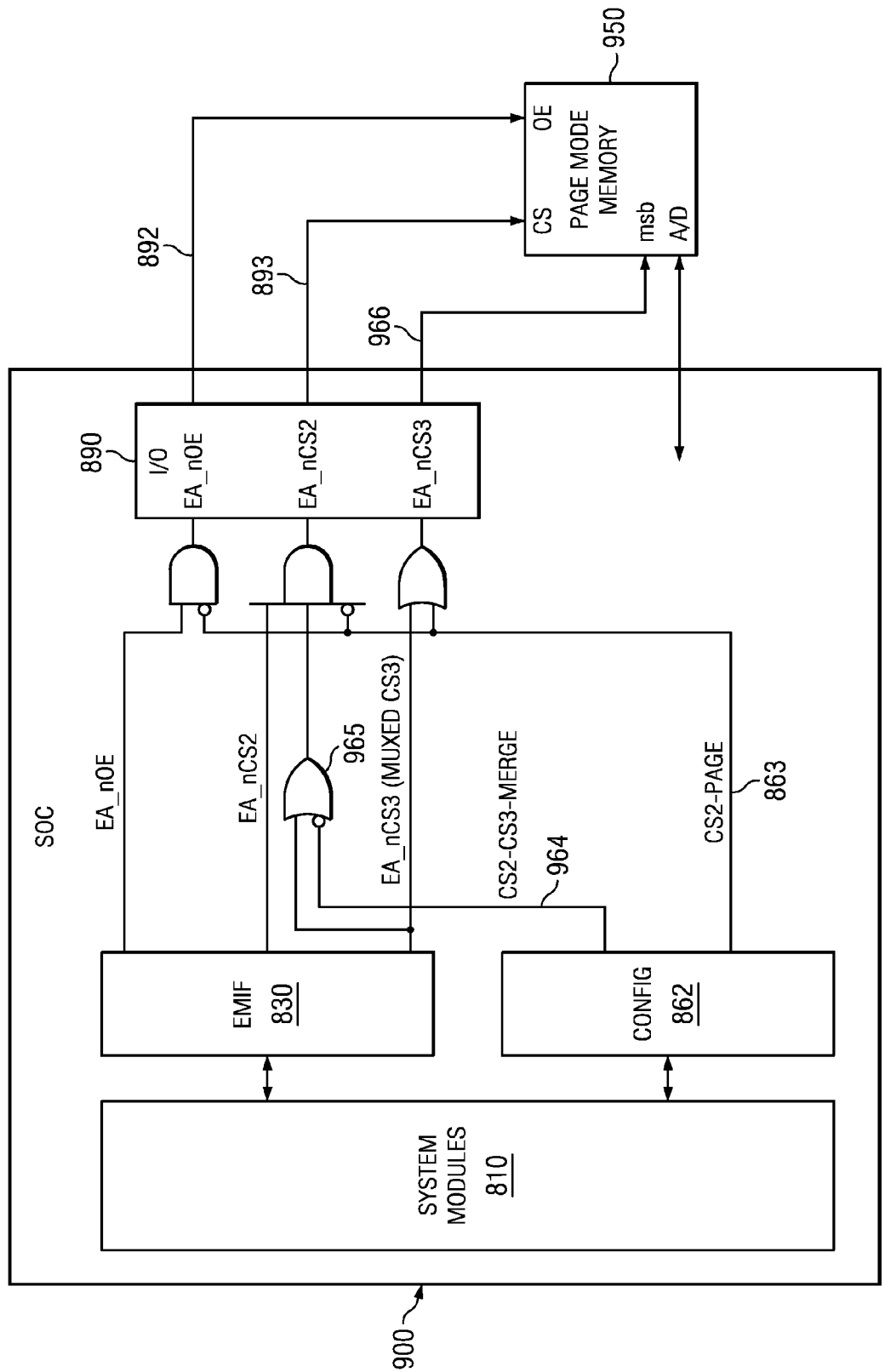

FIGS. 8 and 9 are schematics of alternate embodiments of page mode logic that may be included within an SOC but without redesigning an external memory interface used by the SOC. FIG. 8 illustrates SOC 800 that includes system modules 810 which may be similar to the various processor 102, 103 and DMA 140 modules described above. EMIF 830 is similar to EMIF 130 and does not have native support for page mode access. Configuration module 862 is a GPIO module similar to GPIO 162. Pin buffers 890 provide a final buffer for signals as they are driven off the substrate of SOC 800.

In this embodiment, rather than place glue logic external to SOC 800 to implement dual chip select emulated page mode accesses, glue logic 836 is implemented within SOC 800. This may allow a simple redesign of an existing SOC to add dual chip select emulated page mode access without redesign of the complicated EMIF 830 module.

A new device configuration bit that is accessible by the system processor modules 810 is defined in configuration module 862 that produces signal CS2_page 863. Glue logic 836 implements the following behavior: a) when CS2pagemode=0 (default), the behavior of CS2 893, CS3 and OE 892 is identical to the expected EMIF 830 behavior, that is, CS2 region accesses go to CS2 and CS3 region accesses go to CS3; b) when CS2pagemode=1, CS3 pin is forced to drive logic high, CS2 pin 893 is forced to drive logic low, OE pin 892 is forced to drive logic low.

Page mode flash memory 850 is physically connected to CS2 893 only. Software sets the CS2_page bit, which forces CS2 low, CS3 high and OE low, and then kicks off a linked transfer using a DMA engine in system module 810 to access the memory, as described in more detail above. CS2 is used for timing the first access to a page and CS3 is used for timing subsequent page accesses; e.g. perform one CS2 access followed by seven CS3 accesses, all with only LSB addresses incrementing. Flash memory device 850 responds to address changes to access each next word of a page.

Software should ensure that during this time, no other access to any other asynchronous chip select will occur. This is the typical condition during boot time and thus this embodiment can speed up loading of an image from flash during boot/init by employing page mode of the connected flash. During application run-time, this embodiment would be used only if software can ensure no other accesses will occur to other CS memory spaces.

There may be some limitations to this embodiment if another memory device, such as an SDRAM (synchronous dynamic access RAM) is also connected to the EMIF and is sharing the bus with an asynchronous memory device. Since OE signal is being forced as well as the chip select, there would be contention on the data bus if an application tries to perform an SDRAM read. Refresh commands should not cause contention issue because the data bus is not driven, but they will destroy the accessing sequence during the page mode accesses. Therefore, there may be a restriction that SDRAM is not accessed and auto-refresh not enabled when the page mode feature is in use. The SDRAM can be in self-refresh however since no signaling is required to the SDRAM.

Due to fact that OE and CS are forced together, there cannot be any specific setup time enforced between CS and OE, e.g. CS before OE. This should not cause issue as most page mode devices have no such direct requirement between CS and OE, only between those signals and data or other control.

Due to the implementation in this embodiment, the first address of a page may be driven onto the bus only after the CS and OE signals are asserted. Most page mode devices will kick off a new page load upon change of LSB address bits only even if CS/OE are already asserted, so this would not be an issue. If some setup time is desired from the very first address to CS/OE assertion, a system module could perform a dummy access to the desired address before enabling the feature and forcing CS/OE assertion. In this case, the previous address will remain on the address lines as long as no other EMIF access is performed.

FIG. 9 is a schematic of another embodiment of page mode glue logic within an SOC 900. In this embodiment, in addition to the page mode logic described with regard to FIG. 8, another glue logic function is implemented to allow an application to optionally merge CS2 and CS3 spaces. This feature basically extends CS2 chip select address space to allow an application being executed by system modules 810 to address a NOR Flash which is twice as large, e.g., 128 MB. This new mode is enabled by configuration bit 964 and effectively ANDs (965) CS2 and CS3 to drive CS2 pin 893 that is connected to memory chip select of flash device 950. In this manner, CS3 966 is used as the MSB address bit to the memory. This allows CS2 region addresses to access an upper one half of physical memory while the lower half is accessed at the CS3 region.

The merge feature may co-exist with the dual chip select page mode feature, which means the impact on CS3 is defeated when the feature is enabled. However, CS2 forcing logic is still intact and has effect when this new merge mode is enabled.

Figure 10:
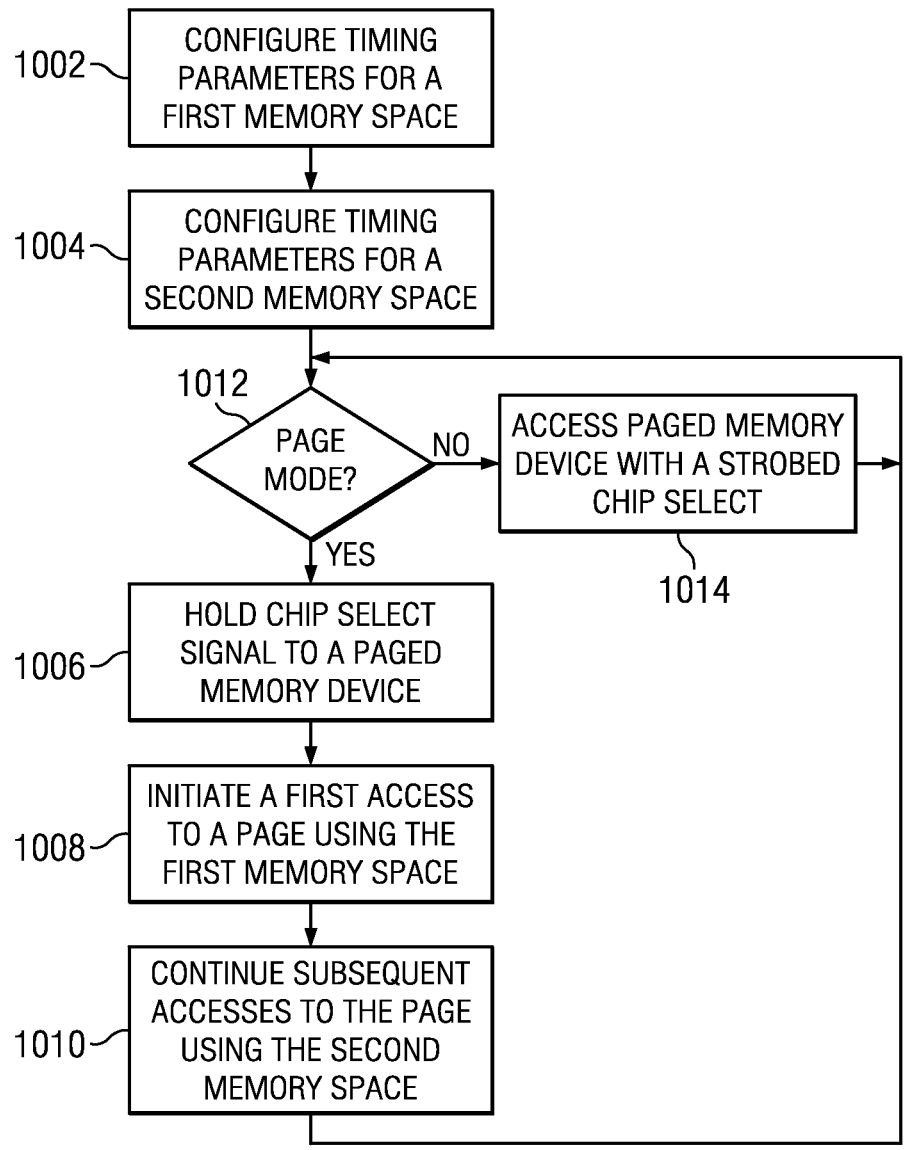
FIG. 10 is a flow chart illustrating access of a page mode device by a memory interface module that does not directly support page mode access.

FIG. 10 is a flow chart illustrating access of a page mode device by a memory interface module that does not directly support page mode access. A first memory space of the memory interface module is configured 1002 with a first set of timing parameters. For example, a first memory space may be configured with a set of strobe timings that specify a one clock period setup time, a twelve clock period strobe time and a one clock period hold time. A second memory space of the memory interface is configured 1004 with a second set of timing parameters. For example, a second memory space may be configured with a set of strobe timings that specify a zero clock period setup time, a three clock period strobe time and a zero clock period hold time.

A page mode access to a page of the memory device is initiated 1008 using the first memory space of the memory interface for at least a first data transfer. The page mode access is continued 1010 using the second memory space of the memory interface for a plurality of data transfers. In this example, the first access will use a strobe timing of twelve clock cycles while each of the remaining page accesses will use a faster strobe timing of three clock cycles.

The page mode access may be initiated 1008 by a processor memory access or by a DMA memory access that is programmed to access the first memory space. The continuing 1010 memory accesses may be done by the processor if it is capable of rapid back to back memory accesses, or they may be done by a DMA transfer.

When a DMA transfer by a first DMA channel is used to initiate 1008 the first access using the first memory space, then the first DMA channel may be chained to a second DMA channel to continue 1010 subsequent accesses to the page using the second memory space.

A processor may hold 1006 a chip select signal for the page mode access to the memory device by writing a data value to a latch, such as a general purpose input/output module, that is connected to a chip select input of the memory device. At the completion of page mode access or a series of page mode accesses, the processor may reset the data latch by writing a different data value.

Alternatively, the processor may hold 1006 the chip select signal by using a glue logic circuit controlled by the processor in place of one or more chip select signals generated by the memory interface. When a page mode access is declared 1012, by the processor setting a mode bit for example, then the chip select signal is forced active during the entire page mode by the glue logic. When not in page mode 1012, then the chip select signal strobe 1014 passes through the glue logic for a single memory access. Single accesses and page mode access may then be performed by controlling the page mode 1012 glue logic.

Other Embodiments

While the invention has been described with reference to illustrative embodiments, this description is not intended to be construed in a limiting sense. Various other embodiments of the invention will be apparent to persons skilled in the art upon reference to this description. For example, more than two chip select spaces may be used if more that two sets of timing parameters are needed for a page mode memory device.

In other embodiments, another type or configuration of external memory interface, DMA engine, and/or page-mode memory device may be used, rather than the particular examples described herein.

Other embodiments may utilize any mechanism which can change the access timing on the bus. For example, if a CPU has different instruction types which could cause different behavior on the EMIF such as single versus multiple load, the different instruction types may be used to change access timing. In another embodiment, there may be an attribute pointer that can be quickly changed to make the EMIF use a different configuration, such as in response to a linked DMA access.

Although the invention finds particular application to microcontrollers implemented, for example, as a SOC, it may also be included in an Application Specific Integrated Circuit (ASIC). An SOC or an ASIC may contain one or more megacells which each include custom designed functional circuits combined with pre-designed functional circuits provided by a design library.

Embodiments of the page mode glue logic for emulated page mode access and methods described herein may be provided on any of several types of digital systems, such as: digital signal processors (DSPs), general purpose programmable processors, application specific circuits, or systems on a chip (SoC) that may include combinations of a DSP and a reduced instruction set (RISC) processor together with various specialized accelerators, for example.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for accessing a memory device by a memory interface, comprising:
    configuring a first memory space of the memory interface with a first set of timing parameters;
    configuring a second memory space of the memory interface with a second set of timing parameters;
    initiating a page mode access to a page of the memory device using the first memory space of the memory interface for at least a first data transfer; and
    continuing the page mode access using the second memory space of the memory interface for a plurality of data transfers.

2. The method of claim 1, wherein the second set of timing parameters produces faster data transfers than the first set of timing parameters.

3. The method of claim 1, wherein continuing the page mode access using the second memory space of the memory interface is performed in response to a first channel of a direct memory access (DMA) controller.

4. The method of claim 3, wherein initiating the page mode access using the first memory space of the memory interface is performed in response to a second DMA channel.

5. The method of claim 4, wherein the second DMA channel is chained to the first DMA channel.

6. The method of claim 1, further comprising asserting a chip select signal for the page mode access to the memory device by using a first logic circuit controlled by a processor coupled to the memory interface in place of one or more chip select signals generated by the memory interface.

7. The method of claim 6, further comprising asserting an output enable signal for the memory device using a second logic circuit controlled by the processor.

8. The method of claim 7, wherein the first logic circuit and the second logic circuit are general purpose output (GPO) modules.

9. A digital system comprising:
    a memory interface having control logic for two or more memory mapped spaces, wherein each of the memory mapped spaces is configured to assert a separate chip select signal and each memory mapped space is operable to configure a set of timing parameters for each chip select signal, the memory interface having address signal outputs;
    a memory device having address signal inputs coupled to the address signal outputs of the memory interface, the memory device having a chip select input, wherein the memory device is operable to perform page mode accesses while the chip select input is active; and
    a data latch having an output, wherein the output of the data latch is coupled to the chip select input of the memory device.

10. The digital system of claim 9, wherein a first memory space of the memory interface is configured with a first set of timing parameters and a second memory space of the memory interface is configured with a second set of timing parameters; and
    wherein the memory interface is operable to access a first word of a page mode access in the memory device using the first memory space, and operable to continue the page mode access using the second memory space of the memory interface for a plurality of data transfers.

11. The digital system of claim 9, further comprising page mode glue logic coupled between the output of the data latch and the chip select input of the memory device, the page mode glue logic having an input coupled to a page select signal from the memory interface, wherein the page mode glue logic is operable to hold the chip select input active when the data latch output is in a first state and to pass the chip select signal from the memory interface signal to the chip select input of the memory device when the data latch is in a second state.

12. The digital system of claim 11, wherein the page mode glue logic is embedded within a system on a chip.

* * * * *